United States Patent Office 3,459,796
Patented Aug. 5, 1969

3,459,796
PRODUCTION OF ACETIC ACID
Leonard Andrew Duncanson and Hans Werner Walter Ehrlich, Norton-on-Tees, England, assignors to Imperial Chemical Industries Limited, London, England, a corporation of Great Britain
No Drawing. Filed Aug. 19, 1965, Ser. No. 481,063
Claims priority, application Great Britain, Aug. 21, 1964, 34,254/64
Int. Cl. C07c *51/32, 51/24, 51/16*
U.S. Cl. 260—533        14 Claims

ABSTRACT OF THE DISCLOSURE

Acetic acid is produced by contacting ethylene in the presence of oxygen and an aldehyde with a solution containing a salt or co-ordination compound of palladium and a salt of at least one of the metals iron, cobalt and manganese.

---

This invention is a process for the production of a carboxylic acid by oxidising an olefine, namely for oxidising ethylene to acetic acid.

The process according to the present invention comprises contacting ethylene with a solution containing a palladium salt and a salt of at least one of the metals iron, cobalt and manganese, in the presence of oxygen and of an aldehyde.

As an alternative to the palladium salt a co-ordination compound of palladium e.g. palladium acetonyl acetonate may be used in the process of the invention.

The solution is preferably essentially free of halide ions and for this reason the metal salts dissolved in it are preferably not halides. Thus the palladium salt may conveniently be a salt of a carboxylic acid, for example palladous acetate, or any other salt of palladium which is soluble in the reaction medium, other than a palladous halide.

The concentration of the salt or co-ordination compound of palladium may be $10^{-2}$ to $10^{-5}$ molar, preferably $10^{-3}$ to $10^{-4}$ molar.

Similarly, the salt of iron, cobalt and/or manganese is preferably not a halide but any other salt which is soluble in the reaction medium may be used. Thus one or more carboxylates may be used, such as ferric, cobaltous or manganous acetate. The salt may, if desired, be prepared in situ, for example by addition of a hydroxide to a solution containing acetic acid. It has proved to be particularly advantageous to use mixtures of salts of two or more of these metals, especially mixtures of a ferric salt with a minor amount, for example less than 5 percent by weight, especially not more than 1 percent by weight, of a cobaltous salt and/or a manganese salt. For example, a suitable mixture may comprise ferric acetate containing of the order of 0.1 percent of cobaltous acetate. Mixtures containing ferric and manganous salts tend to give a higher overall rate of conversion of ethylene but may lead to the formation of higher proportions of by-products than result when mixtures of ferric and cobaltous salts are used. The iron, cobalt or manganese salt or mixture of two or more such salts may also usefully contain a salt of copper.

The concentration of the iron, cobalt or manganese salts or mixture of two or more such salts is suitably $10^{-6}$ to $10^{-2}$ molar.

A wide variety of aldehydes may be used in the process. Thus both aliphtaic and aromatic aldehydes are suitable. The preferred aliphatic aldehydes are the lower molecular weight aldehydes in which the aldehyde group is attached to a straight or branched chain containing up to 6 carbon atoms, for example acetaldehyde, propionaldehyde, butyraldehyde or iso-butyraldehyde. Suitable aromatic aldehydes include benzaldehyde.

The solution with which the ethylene is contacted may conveniently rely upon acetic acid as the solvent and in this way the task of isolating the acetic acid produced is greatly simplified. However, other organic solvents containing only carbon, hydrogen and oxygen atoms may also be employed; for example other carboxylic acids or alcohols are suitable, provided that they are liquid at the reaction temperature. Aqueous reaction media may also be used, but in order to achieve reaction rates which are commercially attractive it is desirable that the solution contain not more than 50 percent by weight, especially not more than 10 percent by weight, of water. A preferred solvent is acetic acid containing approximately 5 percent by weight of water.

The process according to the present invention is carried out in the presence of oxygen. A convenient way of conducting the reaction is to introduce the ethylene into the reaction medium in the form of a mixture with air or oxygen. If it is desired to avoid using explosive mixtures, it is advisable to employ mixtures containing low or high (rather than intermediate) concentrations of oxygen. To avoid the danger of the mixture becoming explosive during recycling of spent gas, it is preferred to use a mixture containing proportions of oxygen of the order of 20 percent or less by volume; for example it may contain 15 percent or 10 percent of oxygen by volume.

The process may be conducted at atmospheric pressure or at elevated pressures, especially pressures up to 50 atmospheres, in particular pressures up to 20 atmospheres. A range of reaction temperatures are suitable and it is particularly useful to employ temperatures in the range of 60° to 120° C., especially temperatures between 70° and 100° C.

The process may be operated batchwise but it is an advantage of the process that it particularly lends itself to continuous operation. The conversion of ethylene to acetic acid appears to involve the production of quantities of acetaldehyde and the reaction is therefore largely self-sustaining in aldehyde. In continuous operation, therefore, while the ethylene and oxygen are consumed and must therefore be added continuously, the aldehyde need only be added in quantities sufficient to make up losses incurred by the formation of byproducts.

The invention will now be further described and illustrated by means of the following examples:

EXAMPLE 1

One litre of a solution containing the following compounds was prepared in a solvent consisting of 95% by weight of acetic acid and 5% by weight of water:

|  | Moles |
|---|---|
| Palladous acetate (0.0225 g.) | $10^{-4}$ |
| Ferric acetate | $4 \times 10^{-3}$ |
| Cobaltous acetate tetrahydrate ($5 \times 10^{-4}$ g.) | $2 \times 10^{-6}$ |
| Butyraldehyde 16.2 g. | 0.225 |

(The ferric acetate was prepared in situ by dissolving freshly-precipitated ferric hydroxide in the aqueous acetic acid. Its concentration was determined by analysis.)

Into this solution, heated to 70° C., a gas stream containing 85 percent of C–14–labelled ethylene and 15 percent of oxygen by volume was passed continuously over a period of 40 minutes. A total of 1.1 g. of acetic acid containing C–14 carbon atoms was isolated from the product mixture.

EXAMPLE 2

One litre of a solution containing the following compounds was prepared in a solvent consisting of 95% by weight of acetic acid and 5% by weight of water:

| | Moles |
|---|---|
| Palladous acetate (0.0225 g.) | $10^{-4}$ |
| Ferric acetate (prepared in situ) | $7.5 \times 10^{-3}$ |
| Cobaltous acetate tetrahydrate ($2 \times 10^{-3}$ g.) | $8 \times 10^{-6}$ |
| Acetaldehyde (3.9 g.) | $9 \times 10^{-2}$ |

Into this solution, heated to 80° C., a gas stream containing 15 percent of oxygen by volume and 85 percent of ethylene labelled with C-14-carbon atoms was passed continuously over a perion of 6½ hours. A further 176 g. (4 moles) of acetaldehyde were added in small amounts throughout this period.

At the end of the reaction time, the mixture was analysed and found to contain 7.4 g. of C-14-labelled acetic acid.

EXAMPLE 3

One litre of a solution containing the following compounds was prepared in a solvent consisting of 95% by weight of acetic acid and 5% by weight of water:

| | | |
|---|---|---|
| Palladous acetate | molar | $3 \times 10^{-4}$ |
| Ferric acetate (prepared in situ) | do | $6 \times 10^{-5}$ |
| Cobaltous acetate tetrahydrate | do | $4 \times 10^{-6}$ |
| Butyraldehyde | mole | 0.225 |

Into the solution, heated to 90° C., a gas stream containing 15% of oxygen by volume and 85% of ethylene labelled with C-14-carbon atoms was passed continuously over a period of 1 hour.

At the end of the reaction time, the mixture was analysed and was found to contain 1.6 g. of C-14-labelled acetic acid.

EXAMPLE 4

Example 3 was repeated except that the solution contained $3 \times 10^{-3}$ molar palladous acetate and the duration of the reaction was 30 minutes.

At the end of the reaction time, the mixture was analysed and was found to contain 1.1 g. of C-14-labelled acetic acid.

We claim:

1. A process for the production of acetic acid in which ethylene is contacted with an acetic acid halide-free solution containing not more than 50% by weight of water, said solution containing (1) a salt or co-ordination compound of palladium selected from the group consisting of palladium carboxylate which does not contain a halide and which is soluble in the reaction medium and palladium acetonylacetonate, and (2) a carboxylate of at least one of the metals iron, cobalt, and manganese which is halide-free and soluble in the reaction medium, in the presence of oxygen and an aldehyde which is selected from the group consisting of aliphatic aldehydes in which the aldehyde group is attached to a straight or branched chain containing up to 6 carbon atoms and benzaldehyde.

2. A process in accordance with claim 1 in which the salt of iron, cobalt and manganese is formed in situ.

3. A process in accordance with claim 1 in which a mixture of salts of two or more of the metals iron, cobalt and manganese is used.

4. A process in accordance with claim 1 in which the aldehyde is an aliphatic aldehyde in which the aldehyde group is attached to a straight or branched chain containing up to 6 carbon atoms.

5. A process in accordance with claim 4 which is conducted at atmospheric or elevated pressure.

6. A process in accordance with claim 1 in which the iron, cobalt or manganese salts, or mixture of two or more such salts contain a salt of copper.

7. A process in accordance with claim 1 in which the concentration of the salt or coordination compound of palladium is $10^{-2}$ to $10^{-5}$ molar.

8. A process in accordance with claim 7 in which the concentration of the iron, cobalt or manganese salts or mixture of two or more such salts is $10^{-6}$ to $10^{-2}$ molar.

9. A process in accordance with claim 8 in which the aldehyde is benzaldehyde.

10. A process for the production of acetic acid according to claim 1 in which ethylene is contacted with an acetic acid solution containing palladous acetate and a salt selected from the group consisting of ferric, cobaltous and manganous acetates, in the presence of oxygen and an aldehyde selected from the group consisting of acetaldehyde, propionaldehyde, butyraldehyde and isobutyraldehyde.

11. A process in accordance with claim 10 in which the ethylene is introduced into the reaction medium in admixture with air or oxygen.

12. A process in accordance with claim 11 carried out at a temperature in the range of 60 to 120° C.

13. A process in accordance with claim 12 in which a mixture of ferric acetate with a minor amount of cobaltous-acetate and/or manganous acetate is used.

14. A process according to claim 1 carried out at a temperature range of 60 to 120° C.

References Cited

UNITED STATES PATENTS

| 3,057,915 | 10/1962 | Reimenschneider | 260—533 |
|---|---|---|---|
| 2,265,948 | 12/1941 | Loder | 260—533 |

FOREIGN PATENTS

| 922,694 | 4/1963 | Great Britain. |
|---|---|---|
| 963,430 | 7/1964 | Great Britain. |

LORRAINE A. WEINBERGER, Primary Examiner

D. STENZEL, Assistant Examiner

U.S. Cl. X.R.

260—604